US008429596B2

(12) United States Patent
Jerrard-Dunne et al.

(10) Patent No.: US 8,429,596 B2
(45) Date of Patent: Apr. 23, 2013

(54) METHOD, AND AGGREGATION COMPONENT FOR AGGREGATING APPLICATION COMPONENTS

(75) Inventors: Stanley Kieran Jerrard-Dunne, Dublin (IE); Bill Looby, Dublin (IE); Margaret Mary O'Connell, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 11/314,063

(22) Filed: Dec. 21, 2005

(65) Prior Publication Data
US 2006/0165123 A1 Jul. 27, 2006

(30) Foreign Application Priority Data

Jan. 6, 2005 (GB) .................................. 0500150.8

(51) Int. Cl.
*G06F 9/44* (2006.01)
(52) U.S. Cl.
USPC ........... 717/104; 717/100; 717/101; 717/103; 717/105; 717/106; 717/107; 717/120
(58) Field of Classification Search .................. 717/104, 717/107, 120, 121, 175, 177
See application file for complete search history.

(56) References Cited

U.S. PATENT DOCUMENTS

| | | | | |
|---|---|---|---|---|
| 5,761,499 A | * | 6/1998 | Sonderegger | 707/10 |
| 6,093,215 A | * | 7/2000 | Buxton et al. | 717/107 |
| 6,269,473 B1 | * | 7/2001 | Freed et al. | 717/104 |
| 6,851,105 B1 | * | 2/2005 | Coad et al. | 717/106 |
| 2003/0041313 A1 | * | 2/2003 | Harmon | 717/105 |
| 2003/0055868 A1 | | 3/2003 | Fletcher et al. | |
| 2003/0135850 A1 | | 7/2003 | Miloushev et al. | |
| 2004/0098706 A1 | | 5/2004 | Khan et al. | |
| 2004/0133660 A1 | | 7/2004 | Junghuber et al. | |
| 2005/0257157 A1 | * | 11/2005 | Gilboa et al. | 715/747 |
| 2006/0005163 A1 | * | 1/2006 | Huesken et al. | 717/107 |

OTHER PUBLICATIONS

Odd Are Sæhle, "Evaluation of Software Reuse at EDB-BC," Jul. 2003, Norwegian University of Science & Technology, pp. 1-129.*

* cited by examiner

*Primary Examiner* — Emerson Puente
*Assistant Examiner* — Jonathan R Labud
(74) *Attorney, Agent, or Firm* — David A. Dagg

(57) ABSTRACT

A method and system for aggregating two or more templated components using an aggregation component is provided. Each templated component has at least one configurable element. The aggregation component comprises at least one configurable element, and an extraction mechanism operable to identify configurable elements of the components selected for aggregation. The aggregation component further comprises a mapping mechanism for mapping configurable elements of the selected components to configurable elements of the aggregation component; a storage mechanism for storing data identifying aggregated components and the corresponding mappings of the configurable elements; and a management mechanism for managing data identifying configuration settings of the aggregated selected components.

29 Claims, 14 Drawing Sheets

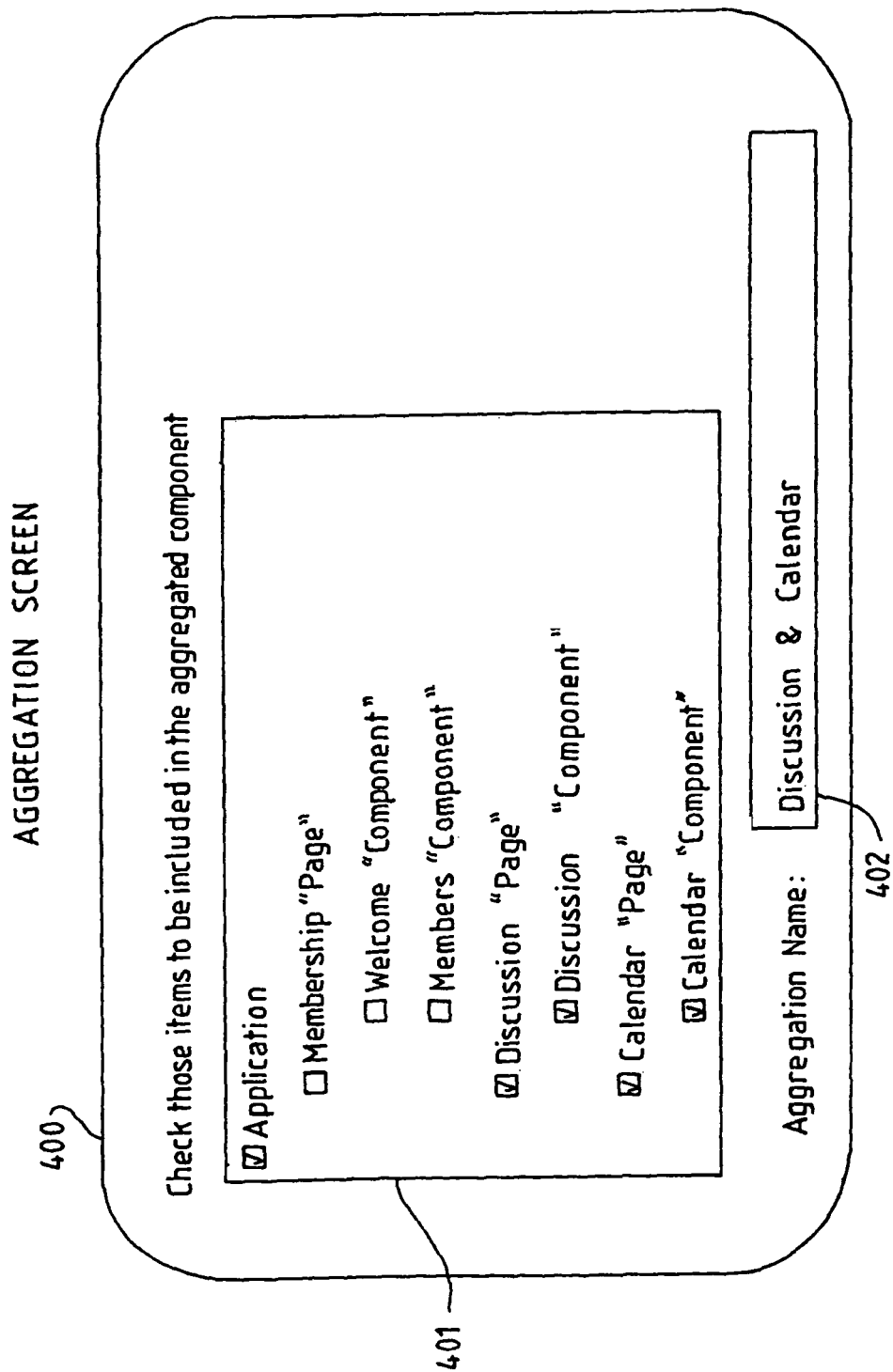

PARAMETERS SCREEN

| COMPONENT | PARAM NAME | USE VALUE | DEFAULT | EDITABLE Y/N |
|---|---|---|---|---|
| Application | Title | | | Y |
| Membership / Welcome | Title | Application/Title | | |
| Membership / Members | Members Title | Membership/Welcome/Title | | |
| Discussion / Discussion | Forum Title | Membership/Welcome/Title | | |
| Discussion / Discussion | Category 1 | | Drafts | Y |
| Discussion / Discussion | Category 2 | | Current | Y |
| Discussion / Discussion | Category 3 | | Archive | Y |
| Calendar / Calendar | View | | Week | Y |

FIG. 5

| COMPONENT | PARAM NAME | USE VALUE | DEFAULT | EDITABLE Y/N |
|---|---|---|---|---|
| Application | Title | | | Y |
| Membership/Welcome | Title | Application/Title | | |
| Membership/Members | Members Title | Application/Title | | |
| Project/Project Man | Name | Application/Title | | |
| Discussion & Calendar | Title | Application/Title | | |
| Discussion & Calendar | Category 1 | | Drafts | Y |
| Discussion & Calendar | Category 2 | | Current | Y |
| Discussion & Calendar | Category 3 | | Archive | Y |
| Discussion & Calendar | View | | Week | Y |

FIG. 7

METHOD, AND AGGREGATION COMPONENT FOR AGGREGATING APPLICATION COMPONENTS

CROSS REFERENCE TO RELATED APPLICATIONS

The present application claims priority under 35 USC 119 to United Kingdom Application Number 0500150.8, filed Jan. 6, 2005.

FIELD OF THE INVENTION

The present invention relates to the field of templated applications, and in particular to a method, system and an aggregator component for aggregating templated application components.

BACKGROUND OF THE INVENTION

An application template is a portable persistent description of a configuration of a software system with defined 'points of variability', which are parameters which can be changed by a user or program developer to customize the software system to represent a particular application. A system using such application templates has been proposed by IBM Corporation, and is described in IBM's co-pending U.S. patent application Ser. No. 10/686,059.

In this system, when a user has configured a software system to a particular purpose using configuration and customization tools for each component in the software system, the user can create a template of the resultant configuration using a template tool. The user identifies the set of components in the software system that represents the application to be templated and browses the configuration of this set to identify the configuration elements which are to be set as the points of variability in the template. All other settings are considered fixed. The template tool traverses the set of components and extracts their prerequisites and content.

The present invention aims to provide an improved mechanism for aggregating components, and in particular to provide a generic, reusable aggregation component that generalizes the functions of aggregation and specialization of templatable components.

SUMMARY OF THE INVENTION

A first aspect of the present invention provides an aggregation component for aggregating two or more components selected for aggregation. Each component comprises at least one configurable element. The aggregation component comprises at least one configurable element; an extraction mechanism operable to identify configurable elements of the selected components; a mapping mechanism for mapping configurable elements of the selected components to configurable elements of the aggregation component; a storage mechanism for storing data identifying aggregated components and the corresponding mappings of the configurable elements; and a management mechanism for managing data identifying configuration settings of the aggregated selected components.

The mappings between configurable elements, also referred to as points of variability, may be set by a user. The user may alternatively, or additionally, specify default values for one or more of the configurable elements of the aggregation component.

The components may further comprise component content and prerequisites and the extraction mechanism be operable to extract these prerequisites and content from the selected components.

The individual components can implement a template interface associated with the template creation process so as to permit the template creation process to query the components for their contents and characteristics, thereby providing a description of the component. Where a component has not implemented the preferred interface, a proxy can be used in its place to extract template content.

A second aspect of the present invention provides a method of aggregating two or more templated components using an aggregation component. Each templated component comprises one or more configurable elements. The method comprises the steps of: selecting two or more templated components for aggregation; mapping one or more configurable elements of the selected components to a configurable element of the aggregation component; and storing instance data for the aggregation component identifying the aggregated components and the corresponding mappings of configurable elements, and instance data for each of the aggregated components identifying their configuration settings as aggregated.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 shows an example of a screen shot in the user interface of FIG. 3, showing an 'aggregation screen', according to an embodiment of the invention;

FIG. 5 shows an example of a screen shot in the user interface of FIG. 3, showing a 'parameters screen', according to an embodiment of the invention;

FIG. 7 shows a further screen shot of a 'parameters' screen;

DETAILED DESCRIPTION OF EXEMPLARY EMBODIMENTS

Figure 1A:
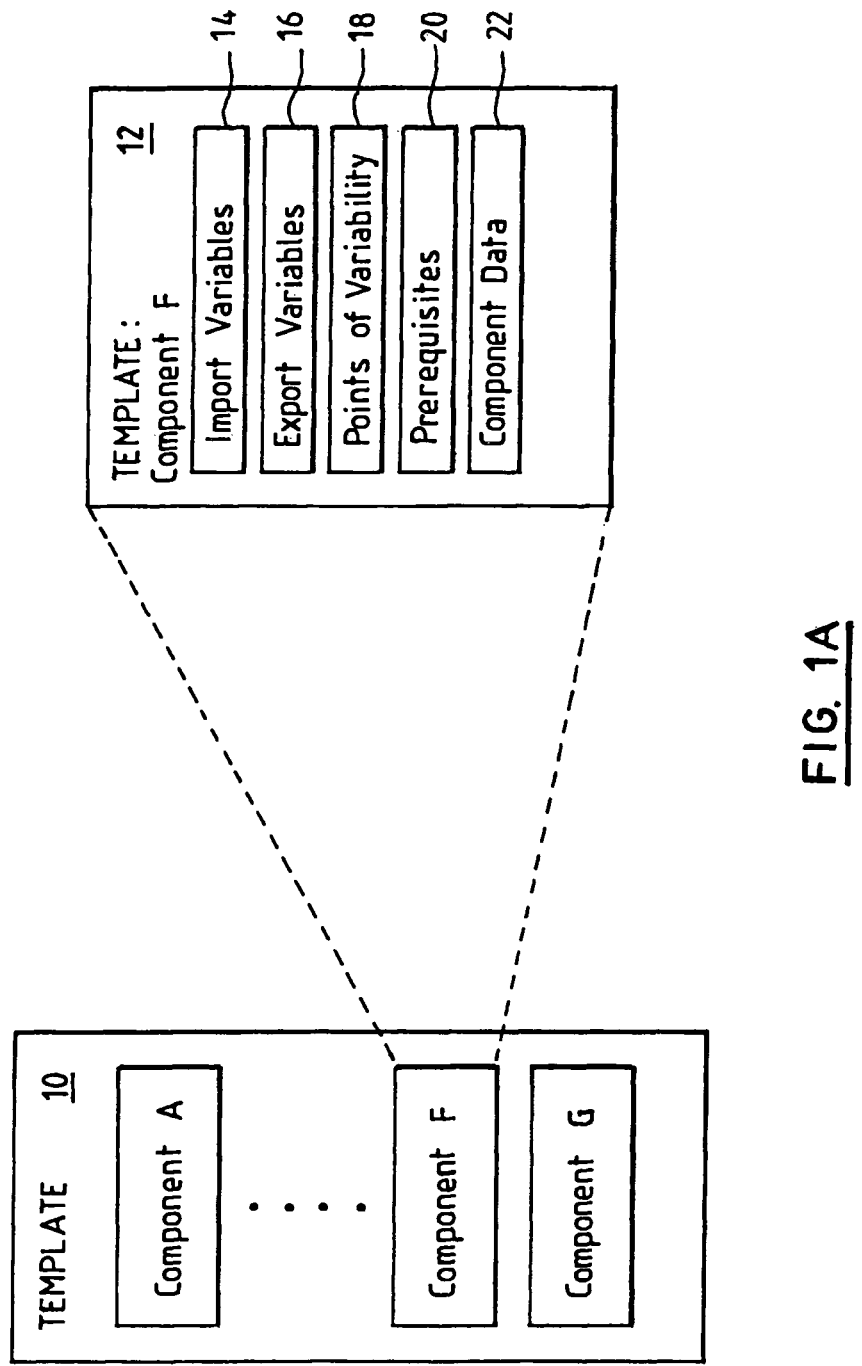
FIG. 1A shows a representation of a templated application showing the template content in respect of one of the contained components.

Referring to FIG. 1a, there is shown a representation of a templated application 10 comprising a plurality of components A, . . . , F, G, as well as details of the template content in respect of component F.

Component F is described by its own template 12, which includes variables, namely import variables 14, export variables 16, and points of variability 18; prerequisites 20; and component data 22. The import variables 14 are variables which are required for instantiation of the component; and the export variables 16 are made available as input to other components upon instantiation. The points of variability are parameters whose values need to be provided by a user of the template. The prerequisites list backend resources to which the component refers, typically identified by name and version. The component data is data specific to component F and may include a set of tasks, and folders for example.

Figure 1B:
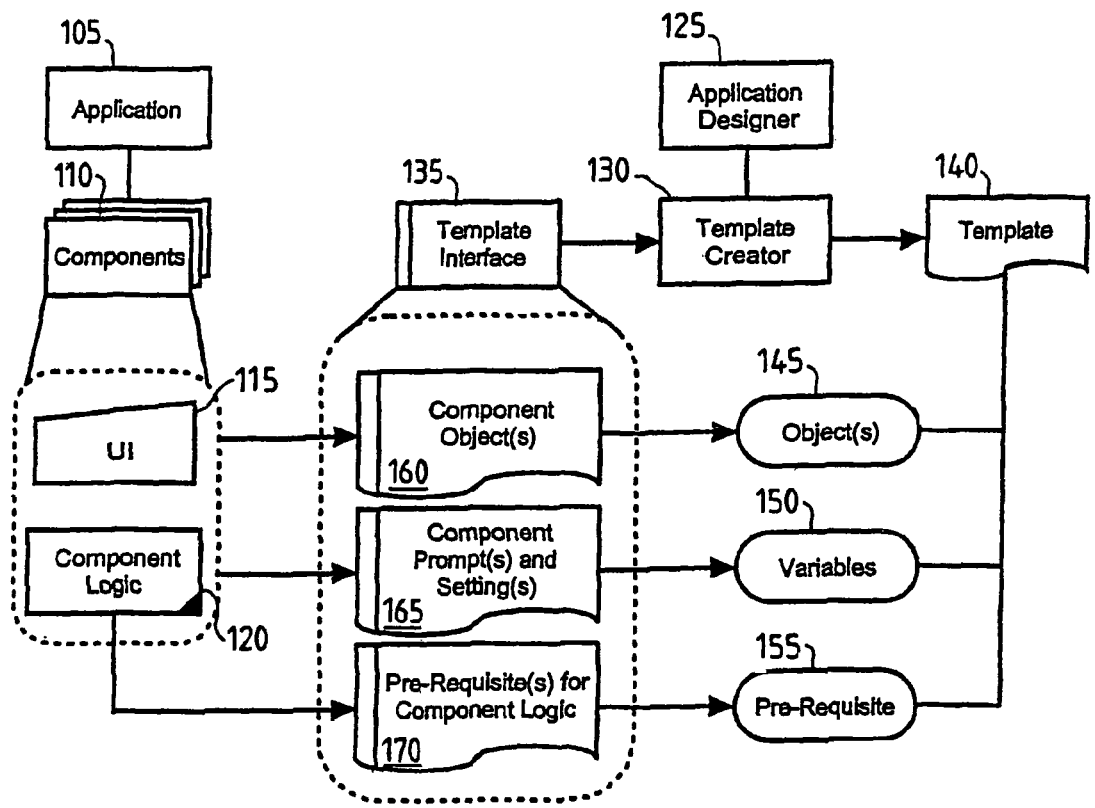
FIG. 1B shows a block diagram of a system for creating an application and/or a template.

FIG. 1b is block diagram of a system for designing an application using templates and for creating templates having points of variability. The system can include an application 105 including a multiplicity of application components 110. The application 105 can reflect a customized configuration of a generic software system particular to a specific problem space. In furtherance of this purpose, the application can include a collection of data stores, logical components, end user roles, end user activities, and application tools. Each can be coordinated with one another to form the basis of an application instance having a specific configuration.

Different ones of the components 110 can include component logic 120 dictating the behavior of the components 110. Additionally, to the extent that a view can be associated with one or more of the components 110, a user interface 115 can further be provided. To support the operation of the application 105 and the respective component logic 120 of the components 110, an application server (not shown) can be provided. Optionally, a portal server (also not shown) further can be provided to support user interaction with the component logic 120. In any case, as it will be recognized by the skilled person, a particular configuration can be required to coordinate the operation of the application 105 in order to produce a computing experience applicable to a specific problem space. Yet, the lack of a rigid, constant arrangement and configuration of the components 110 can lend itself to flexibility in producing multiple different computing experiences directed to a unique problem space.

Importantly, to reproduce a specific arrangement and configuration of the components 110 of the application 105 as a persistent solution applicable to a particular problem space, a template 140 can be produced to reflect the unique arrangement and configuration of the components 110. Specifically, a template creation process 130 coupled to an application designer 125 can generate elements of the template 140 which subsequently can be used to reproduce the specific arrangement and configuration of the components 110. In particular, the elements can include a component specification 145 of the components 110 arranged to form the application 105, one or more points of variability 150 within the components 110, and a specification of pre-requisites 155 required for the operation of the application 105 as configured.

The component specification 145 can include one or more references to those ones of the components 110 forming the application 105 specified by the template 140. The points of variability 150, by comparison, can include respective references to configurable elements and of the configuration of the component objects 160 referenced in the component specification 145. The configurable elements can include configuration settings and parameters and can be range limited within the template 140. Finally, the pre-requisites specification 155 can indicate within the template 140 those pre-requisite resources 170 which are required for the operation of the application 105 as configured and described in the template 140. Exemplary pre-requisite resources 170 can include data store accessibility logic, content transformation logic and the like.

To facilitate the creation of the template 140, a template interface 135 can be provided for implementation by the components 110 of the application 105. The template interface 135 can include a specification of methodologies used by the template creation process 130 to describe the individual components 110 in terms of name, invocation process, prerequisite resources and configuration parameters. By implementing the template interface 135, the component objects 160 of the application 105 can permit their inclusion in the template creation process 130.

Figure 1C:
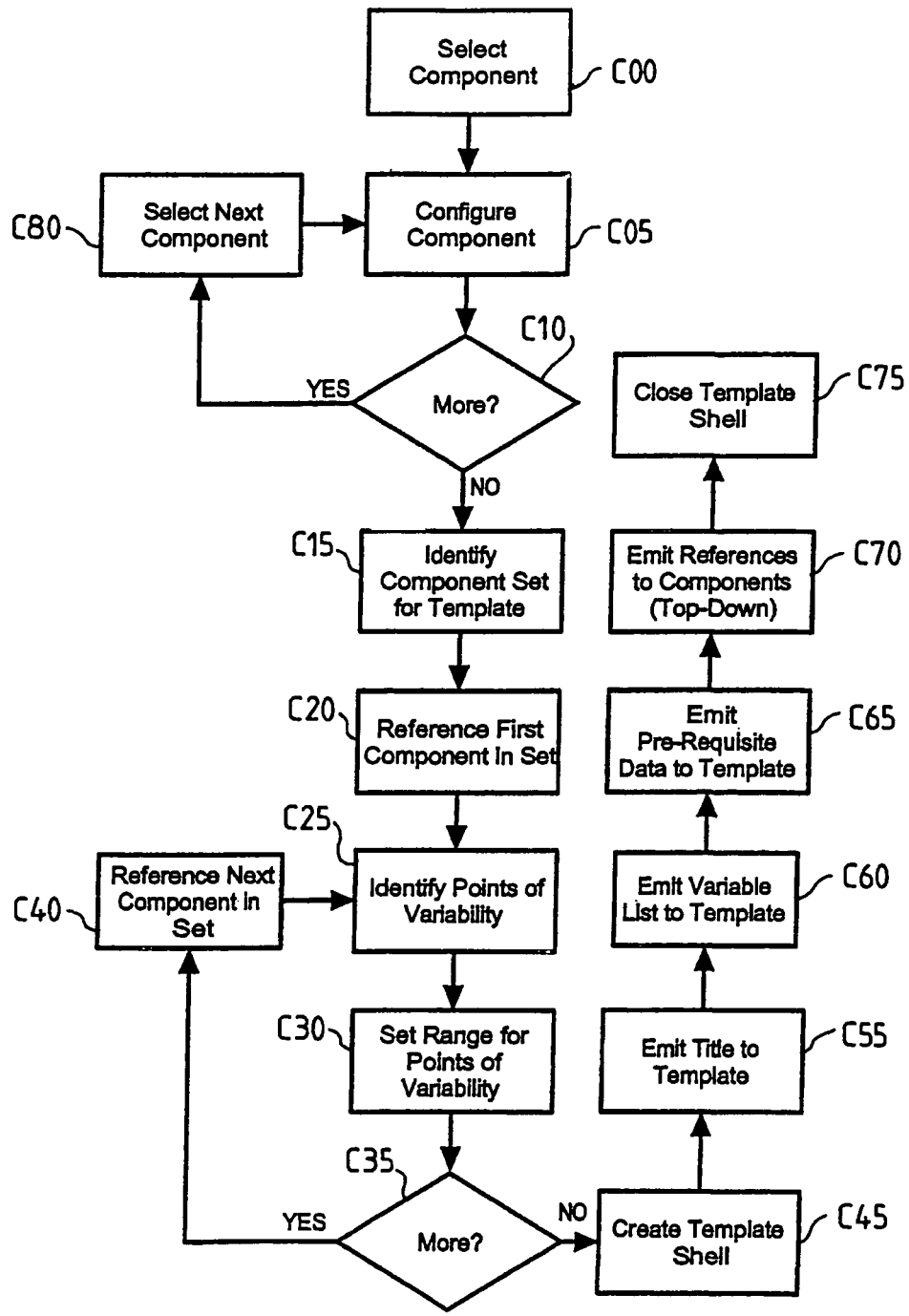
FIG. 1C shows a flow-chart illustrating a process for producing a template.

Turning now to the specific operation of the template creation process 130, FIG. 1C is a flow chart illustrating a process for producing a template having points of variability. Beginning in block C00 and continuing through blocks C05, C10 and C80, each component in the application can be configured as desired to produce a customized application. In this regard, the configuration process can include specifically arranging a selection of the components of the application to serve a specific problem space. In addition, component parameters can be established to further suit the specific problem space. As an example, field labels and the arrangement of elements in a form can be modified to better suit data input and review for a customized version of the application.

In any case, once the application has been customized through the specific configuration, in block C15 the set of components to be arranged to form the application can be identified to the template creation process. Subsequently, in blocks C20 through C40, within each identified component, points of variability can be specified as can an allowable range of values or a default value for each point of variability. In decision block C35, when no further points of variability remain to be identified within the set of identified components, all other configuration elements for the customized configuration can be considered fixed and in block C45 a template shell can be created for the customized configuration of the application and its respective points of variability.

In particular, in block C55 a title for the customized arrangement and configuration can be "emitted" to the template. In this regard, the title can be written to the template file, for example, in the form of title content demarcated by markup language tags conforming to a pre-formed document type definition for the template. Additionally, in block C60 the points of variability of block C25 and their respective ranges or default values of block C30 can be emitted to the template in block C60. In block C65, the pre-requisite data for the application can be emitted to the template as well in order to indicate those resources which are required for the suitable operation of the application as configured in the customized arrangement.

Significantly, the collection of components specified in block C15 can be traversed through the template creation process. In block C70, for each component in the collection, a reference to the component can be written to the template based upon which the component can be accessed when customizing the application for operation in accordance with the persisted definition of the customized application. To the extent that the components are inter-related through a series of interdependencies, the references to the components can be emitted to the template in a top-down manner. Once the references to the components have been emitted, the template shell can be closed in block C75 and a reproducible representation of the customized application can be persisted therein.

It will be recognized by the skilled person that the components of the application may not inherently include an interface suitable for integration with the template creation process of the present invention. Consequently, where feasible, the individual components can implement an interface associated with the template creation process so as to permit the template creation process to query the components for their contents and characteristics. Yet, where a component has not implemented the preferred interface, a proxy can be used in its place to extract the template content.

Once the template has been created, at any subsequent time, the customized application can be recalled through a processing of the template in which the customized application had been persisted.

Figure 1D:
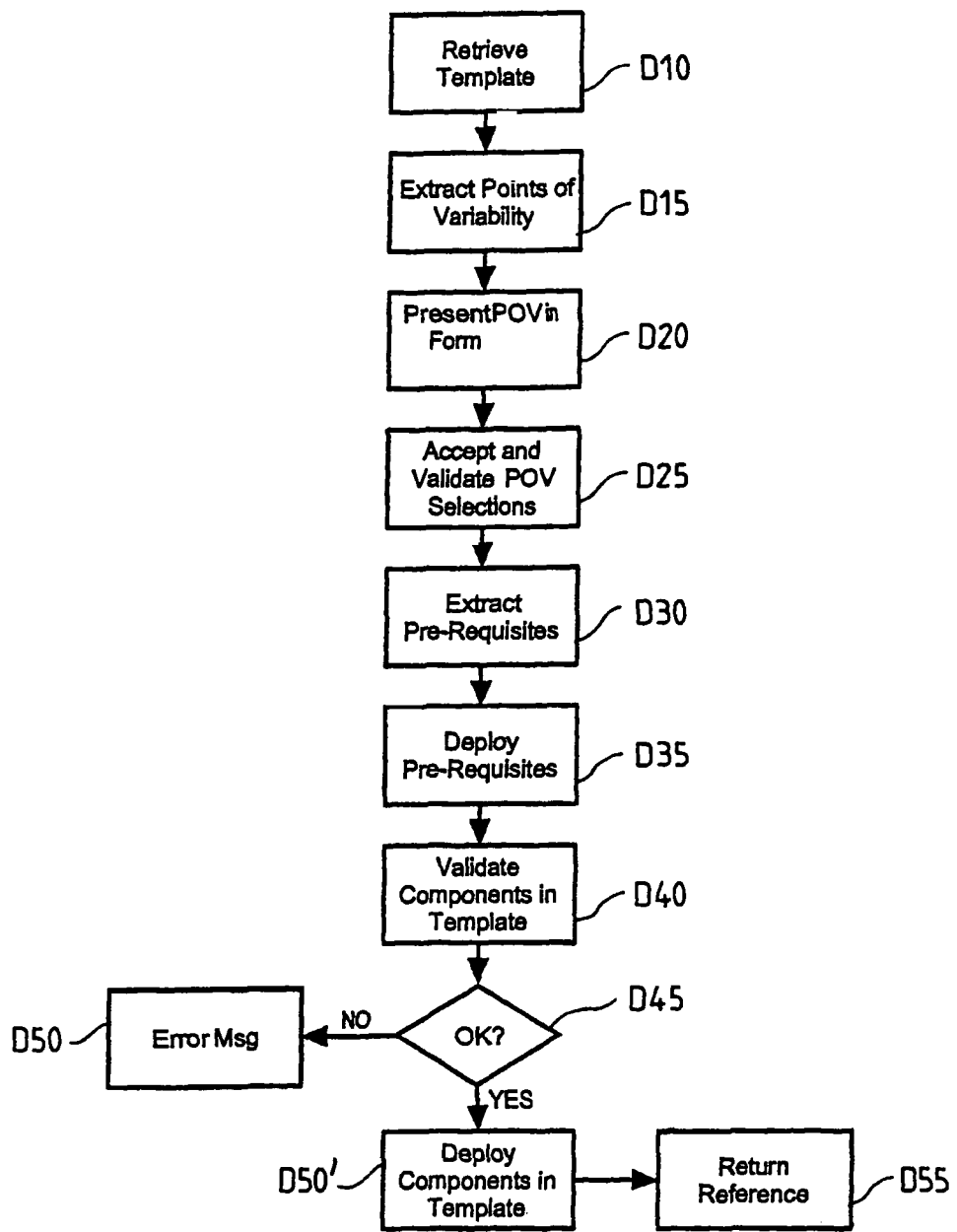
FIG. 1D shows a flow chart illustrating the use of a template to apply a new design.

FIG. 1D is a flow chart illustrating the application of a new design template, such as a new template produced through the process of FIG. 1C. In block D15 the points of variability within the new template can be extracted as can a set of associated default values or ranges for the points of variability.

Notably, within the template, a set of prompts can be included for presentation to the end user when soliciting values for the points of variability. Accordingly, in block D20 the prompts can be presented through a form to receive values for the points of variability. Within the form, the acceptable ranges and any default values further can be presented in association with the points of variability. In any case, in block D25 each of the selections for the individual points of variability can be accepted and validated for consistency with the acceptable range of values.

In block D30, the pre-requisite resources for the arrangement of the components and operation thereof can be extracted from the template. Subsequently, each of the referenced pre-requisite resources can be deployed. In block D40, each of the components specified in the template can be validated. To the extent that the components are arranged in a hierarchy of dependent components, the hierarchy can be descended recursively both during the validation phase and during the deployment phase. When each component has been deployed, a resulting reference can be passed to components which depend upon the deployed component.

Notably, if in decision block D45 the components fail to validate successfully, in block D50 the error can be handled accordingly. Otherwise, in block D50' each of the components can be deployed as specified by the template and the accepted points of variability can be applied thereto. Finally, in block D55 a reference to the application can be returned as an instance in the template management application and through which interaction with the application can commence.

The proposed aggregation tool provides a means whereby components in a templating infrastructure can be combined (aggregated), specialized (have some of their points of variability 'fixed') and wired (have some of their points of variability set based on the containing components points of variability). The features that provide for this are that of containment and point of variability mapping, and these will be described in more detail below.

Figure 2A:
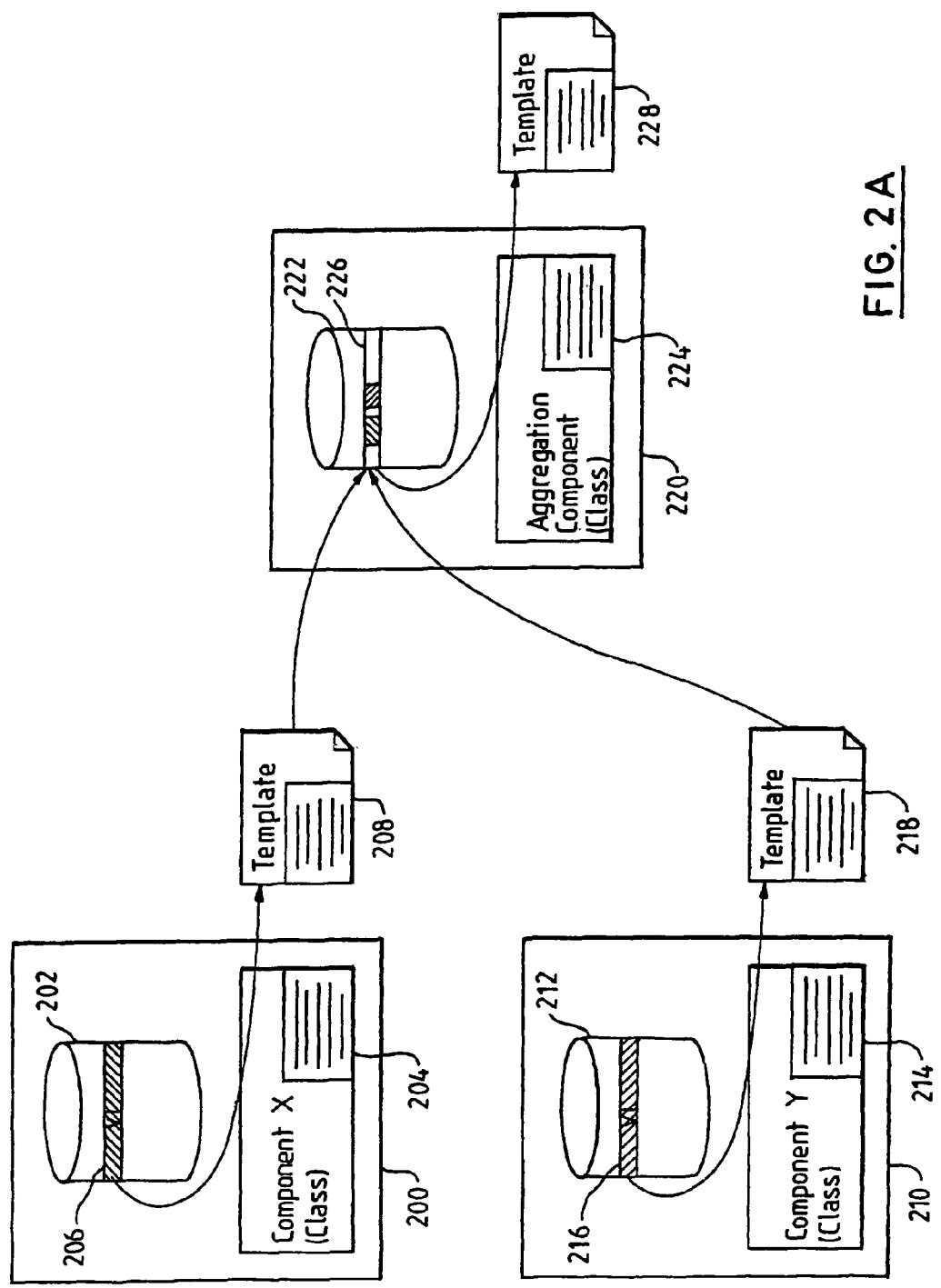
FIG. 2A shows the production of a template of an instance of an aggregation component according to an embodiment of the invention.

FIG. 2A shows the production of a template 228 of an instance of the aggregation component which represents the aggregation of instances of two components X and Y. In the object-oriented environment shown, each of the components is implemented as a class 204, 214, 224, which may manage a plurality of instances, each defined by its own instance data. As depicted in FIG. 2A, each component 200, 210, 220 has an associated data store 202, 212, 222 wherein the instance data is held for each instance of the component class. This instance data represents the configuration settings of particular instances of the components. As shown in FIG. 2A, the instances of components X and Y that have been aggregated are shown as 'v1'. The instance data 206 for the v1 instance of component X is stored in associated data store 202. The instance data 216 for the v1 instance of component Y is stored in associated data store 212.

The aggregation component may be used to aggregate any number of templated components, with the resultant aggregate components being implemented as a new instance of the aggregation component.

The instance data 226 for the aggregate of X(v1) and Y(v1) is stored in the aggregation component's associated data store 222. This instance data contains a reference to the constituent component instances X(v1) and Y(v1), namely their instance IDs, as well as the mappings between parameters of the constituent components and those of the aggregate component. These mappings allow the points of variability of the constituent components to be forwarded, set or linked together, as will be explained later.

Figure 2B:
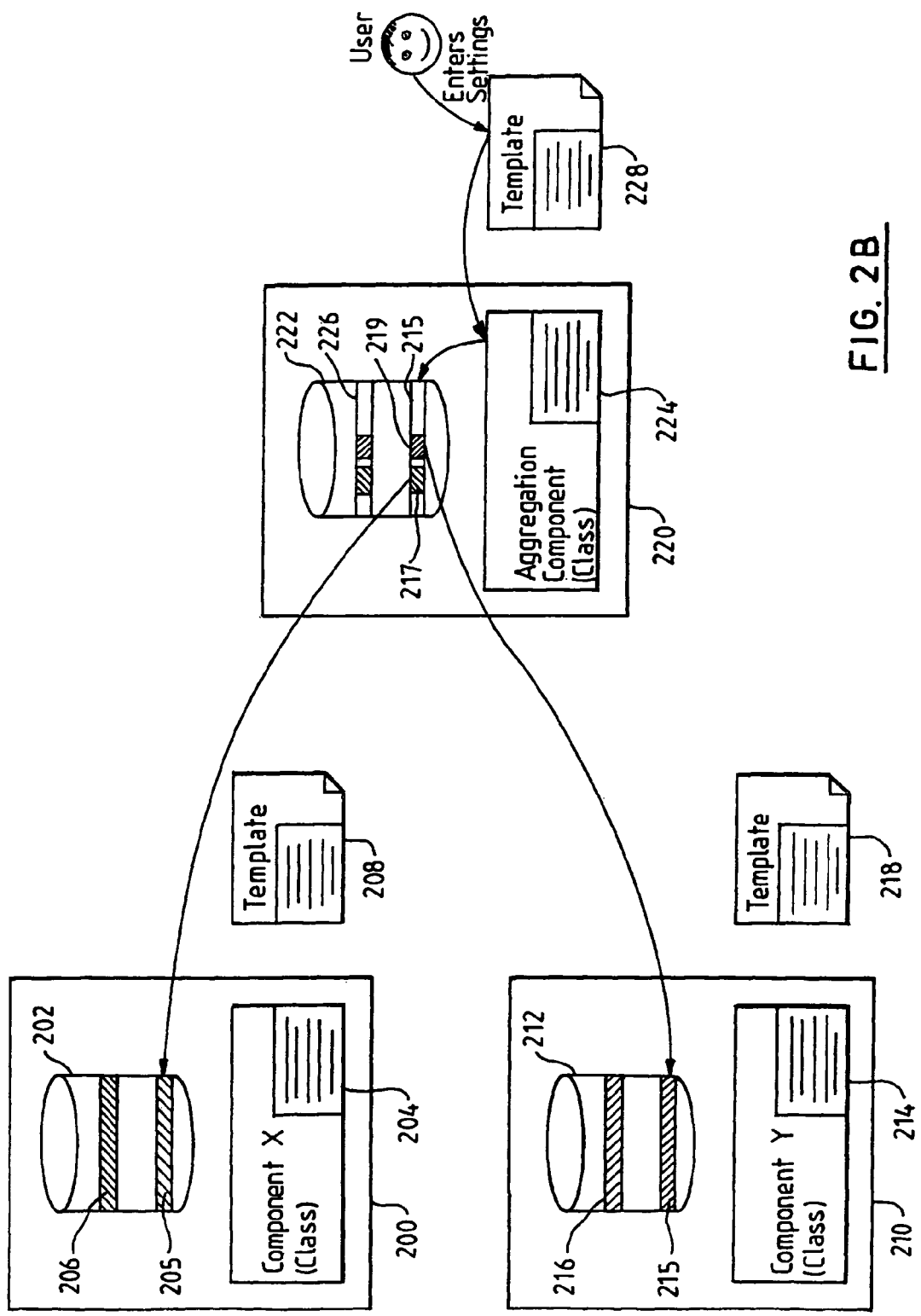
FIG. 2B shows the creation of a new application instance by a user according to an embodiment of the invention.

When a template of the aggregate component is required, the aggregation component will send each of the constituent components a request to provide a template of themselves. Each component instance then describes itself in a template 208, 218 to which the instance data 206, 216, i.e. the settings for the chosen instance, is added to the component data. The points of variability listed in the templates 208, 218 are those specified by the relevant components. These two instance templates are then used by the aggregation component to provide a template 228 of the aggregation of components X and Y. In this template the points of variability are those of the aggregated component, which can then be set by a user when creating an application according to the template 228 of the 'X(v1)+Y(v1)' instance of the aggregation component (as shown in FIG. 2B). The user produces a new instance of the aggregated component (i.e. a new application according to the template) by entering the required parameters into the template. The aggregation component 224 then uses the template and data entered by the user, to create and store the relevant instance data 215 for the new instance in its associated data store. The aggregation component sends each of the constituent components relevant instance data for the new instance, which is stored 205, 215 by the constituent components in their associated data stores 202, 212.

Methods are described generically below as implementation may be Java classes, Enterprise Java Beans, Web Services or many other mechanisms, as will be appreciated by one skilled in the art. It is assumed that methods apply to 'stateless' objects that therefore need an instance reference to be passed, as this applies most easily to Web Services, and Stateless Session EJBs.

Additional methods are involved to provide templating ability, that is the production of an XML description (the template) which is sufficient to create further instances of a component.

The aggregation tool may enable the user to make the points of variability of contained components available (through the points of variability of the aggregated component) or fix them such that a user cannot alter these in the aggregated component.

So, suppose a designer wishes to build an aggregate component that includes two 'basic' components called X and Y. Suppose X has four points of variability, say: Name, BackgroundColour, Height, and Width; and that Y has the same four points of variability plus an extra point of variability, say, Categorized.

In creating the aggregate component the designer might want to do the following:

set the names of each 'basic' component so that users cannot change them from the value given by the component developer;

set the heights and widths of view items (i.e. fix the layout in the template);

expose the background color such that users can set this, but once only so that both parts of the aggregate component match;

expose the 'Categorized' point of variability, such that users can define the value of this variable; and add a new point of variability 'Name' to the aggregate component, (not fixed to the names of either of the basic components), so that users can choose a name for their instance of the aggregate component.

Thus the aggregate component will have the points of variability: Name; BackgroundColour; and Categorized. This aggregate component may now be used to provide a template for use by users, which they can use for their own applications to which they can apply their own settings to these three points of variability.

The aggregated component needs to provide generic containment. Essentially this means managing the lifecycle of contained components (so that they can be instantiated and removed with the container), and providing a means to iterate through the contained components.

In order to manage the lifecycle of 'contained' components about which the aggregation component knows little, the contained component exposes 'known' methods, including:

CreateInstance: Accepts all parameters defined as applicable for the object, as input, and returns a reference to the created instance; and RemoveInstance: Accepts an instance reference and removes the instance data for the referenced instance.

FIG. 2B shows the process when a user creates a new application using the template 228. The user will be asked to enter the values he/she wishes to use for the points of variability specified in the template, such as entering a new name. To persist the new application instance, the instance data for the new instance of the aggregate component is stored as a new entry 225 in storage 222. Also, the new instance data 227, 229 relating to each contained component is passed to the instance data store 202, 212 for each contained component where it is stored as a new entry 205, 215 (using the CreateInstance method). This enables the lifecycle of an aggregate component instance to be managed by the aggregation component, such that when the new application is closed down, the instance data for the contained components will be removed from the relevant instance data store (RemoveInstance method).

In order to know which components are contained in the aggregate component, the aggregate component exposes a 'known' method:

GetContainedObjects: Accepts the instance reference, and returns a reference to all contained objects.

An aggregate component has two options on exposing contained components (using GetContainedObjects above):

1) Fully: This means that although there may be points of variability mapping to contained components, it is still possible to traverse the contained components and retrieve their individual points of variability. This may be desirable where the aggregation is for convenience but the flexibility of modifying contained components directly is still useful.

2) Mapping only: In this case, the component does not expose its contained components, and the only access to them is through the mapped points of variability.

A generic aggregation tool supports both options.

A basic method of retrieving parameter information from both the contained component and the aggregated component called getParameters can be used. This accepts an instance reference, and returns a list of parameter definitions, containing the type of parameter, as well as possible optional parameter characteristics such as validation data, and presentation data. The type of parameter can for example be a java type (e.g. "java:java.lang.string") or a complex XML schema definition.

The validation data identify a range of acceptable values which a user may enter for a particular parameter. The criteria can then be applied on instantiation to check the user has entered a valid parameter. It would also be possible to specify the validation schema that is intended to be used, so as not to commit to any one method of validation.

The presentation details can be for example prompt and help text, to help the user enter the parameter details. These may also specify the User Interface (UI) schema being used (e.g. XForms, UIML (User Interface Markup Language), XUL (XML User interface Language), AUIML (Abstract User Interface Markup Language) etc.). Any component may present its own UI (e.g. a Java™ ServerPage or HyperText Markup Language fragment) if it has particular requirements, using the presentation schema above. However, generic UI mechanisms such as XForms and UIML are preferred.

The aggregation tool is configured to map the points of variability of a contained component to those of the aggregate component in any of the following ways—

Set: a value may be entered for the point of variability (this is then 'fixed' and will not be made available to the user);

Forward: a point of variability of the contained component may be forwarded as is, such that it appears as a point of variability of the aggregate component;

Forward/Default: a point of variability may be forwarded, as above, but with a default value set for it (for presentation to the user);

Wire: an existing point of variability of the aggregate component may be mapped to a point of variability of a contained component. This is useful where several components are to receive a user-entered value from a single aggregate component's point of variability.

The aggregation component then persists the configuration of the new instance (i.e. the component mappings) so that this configuration can be made available for reuse. There are a number of ways in which it can do so—

1. In a new Concrete Portlet. This is appropriate only if there is a concrete portlet to 'front' end the aggregation (i.e. there is an additional portlet that is used to group the contained components)

2. In a private store. This is appropriate, if 'live' support is required, and there is no concrete portlet. Live support would include the ability to set parameters at runtime (rather than just the parameters discussed above which are set at instantiation time).

3. In a template, as part of a template definition to be used during instantiation. Templating requires self-description as explained above.

As the values mapped by the aggregation component may be of different types (for example a string holding a data value), the aggregation component preferably comprises a transformation mechanism, which is capable of transforming/converting between different types of parameter, for example converting a parameter from date string format in one component to integer format for use by another component.

An important extension to the capabilities described above, is that of allowing a component to use a value produced by another component (on instantiation) as the input to its point of variability. An aggregate component can 'wire' this relationship directly, without needing to create a point of variability of its own. So, for example—
"template.ldapmanager.defaultldapserver"—>
"template.instantmessaging.ldap server"
where the "ldapmanager" component goes and finds the default ldpa server on instantiation and makes it available. For this reason, components can define values they produce (ExportVariables 16), and values they consume (Import variables 14) as well as points of variability they accept 18.

In order to establish that some 'variables' can be made available the method getAvailableVariables is defined by a contained component. This method returns, in response to receiving an instance reference, a list of the definitions of variables that will be produced after instantiation. The order of instantiation of components can thus be important as produced values are only available after instantiation of the component that defines them.

In the case where contained components are fully exposed, a means of differentiating the points of variability of a component from a component higher in the aggregation hierarchy is required. For example a template may want to map two parameters as follows:
    "HomeLocation"→"template.map.ZIP"
    "BranchLocation"→"template.branches.map.ZIP"

A point of variability of a component can be 'mapped twice', in this case, as it can be mapped from the template directly, but may also have been mapped from intermediate aggregate component "branches" above. In this case it is the responsibility of the aggregate component to ensure the external mapping takes priority (i.e. it ignores its own mapping for that parameter).

An example embodiment will now be described in relation to a portal server, though the present invention may be applicable to any templated environment. The two 'basic' components to be aggregated are two portlets on a portal server. The first is a U.S. map portlet, which provides map images with a Zoom In/Out function This portlet can display information about any zip code on the map, as long as the information is stored in a Standard Query Language (SQL) database and an appropriate simple schema mapping is provided. A default zip location can be set. This map portlet can produce a description of itself in the form of a template having two points of variability: Name and Default zip location.

The second portlet is a company branch information portlet, which allows the listing of all of a company's branch details. A default view can be set to show any/all branches in a given zip code, and a default zip location can be set. This company branch info portlet can produce a description of itself in the form of a template having two points of variability: Name and Default zip location.

These portlets can be configured to share information, such as a Zip code entered by a user, using the portlet data sharing method described in IBM's US patent application published under No. 2004/0090969, which is incorporated herein by reference. This data sharing mechanism can also be used to share parameters between two portlets contained in an aggregate component.

A designer wishing to produce a component which includes these two portlets, adds these portlets to a new instance of the aggregation component. First the U.S. map portlet is added and the designer sets the database schema mapping so the portlet can retrieve data from the "Company Branch Information" database. Next, the portlet property that should receive the zip code is set to "ZIP". The designer then wires the default zip location to a point of variability of the aggregation component so that a user will be asked for it on instantiation.

Next the designer adds the company branch information portlet, and sets it to make the zip code of any selected branch available using the property "ZIP". The designer wires the default zip location to the same point of variability of the aggregation component as above.

These portlets are now set up to use the same database, and are defaulted to the same zip code using a single point of variability of the aggregation component that will set the default zip code for both portlets. The new instance of the aggregation component is now made available so that anyone can reuse this component. It contains only one settable point of variability, the ZIP code, which will apply to both portlets. None of the rest of the linkage between can be changed by a user (and therefore broken). So the previous individual components (the portlets) have been aggregated and specialized into a new reusable component.

An example of the use of a system according to a preferred embodiment will now be described with reference to FIGS. 3 to 8, which show examples of a possible user interface that may be used.

Figure 3:
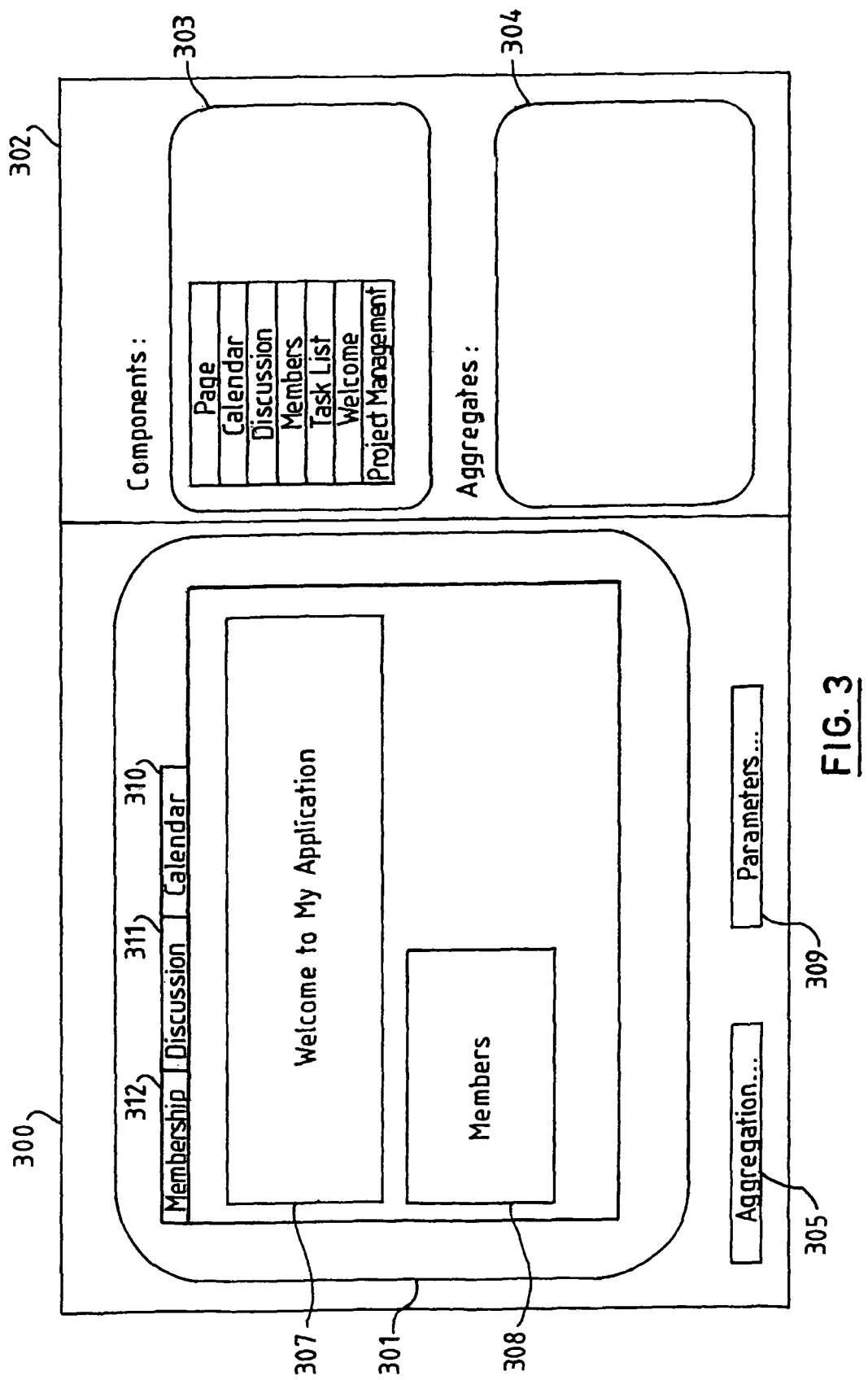
FIG. 3 shows an example of a screen shot which may be presented to a user by a user interface according to one embodiment of the invention.

First of all the developer creates an application template from a number of available components. FIG. 3 shows an example of a page 300 which may be displayed to a user. This page comprises a panel 301 on the left on which an application template may be assembled. The palette 302 on the right lists the stand-alone 303 and aggregation components 304 (none so far) which may be added (e.g. through drag and drop) to the application. The page also includes an aggregation button 305, which will take the user to an aggregation screen, and a parameters button 309, which takes the user to a parameters screen.

In FIG. 3, the application template under creation so far comprises three pages which have been designed: a calendar page, a discussion page and a membership page, which is currently selected. To the membership page, a 'welcome' component 307 and a 'members' component 308 have been added.

The developer can manage parameters of the application template using the parameters screen which is displayed when the parameters button 309 is hit. An example of the parameters screen is shown in FIG. 5. This shows a list of the components selected and each of their parameters (points of variability), and allows the user to indicate the mappings required between these and the points of variability of the application template under construction. As shown in FIG. 5 there are eight parameters belonging to individual components which are being used, and the table lists a default value for these (if any) to be used in the application template, as well as specifying whether this can be edited by an end-user. For each of the eight parameters, the developer can wire its value to be used in the application template to the value of another of these parameters. This is done by specifying the use of a particular other parameter value via an entry in the 'Use Value' column of the table. For example, the developer has specified that for the 'Title' of the Welcome component, the 'Title' given to a particular application instance of the application template should be used. As shown in FIG. 5 no default has been set for the application title and the parameter is editable by an end user, so the Title parameter of the application (and of the welcome page) will be that entered by an end-user as the Title of a new application instance during its creation using the application template. The MembersTitle and ForumTitle parameters will also have the same value 'Application Title' as they are 'wired' to the title of the welcome component.

If the application shown in FIG. 5 were to be created as a single aggregate component, it would have five parameters which will be variable by a user: Title, Category_1, Category_2, Category_3, and View.

FIG. 4 shows the screen that would be displayed if a developer were to hit the aggregation button 305. The aggregation screen 400 shows a hierarchical list 401 of the pages (and the components within those pages) of the application that has been created, and an input box 402 in which the user can enter a name for the aggregated component. This screen allows a developer to create an aggregated component from the Membership, Discussion and Calendar components. The developer can select the components which it requires to be included in the aggregate component by checking the relevant boxes on the screen.

As shown in FIG. 4, the developer is creating an aggregate component comprising the discussion and calendar components (no membership component selected), and calling this aggregate component 'Discussion & Calendar'. When this aggregate component has been created it will appear in the list of aggregates 304 on the palette.

Figure 6A:
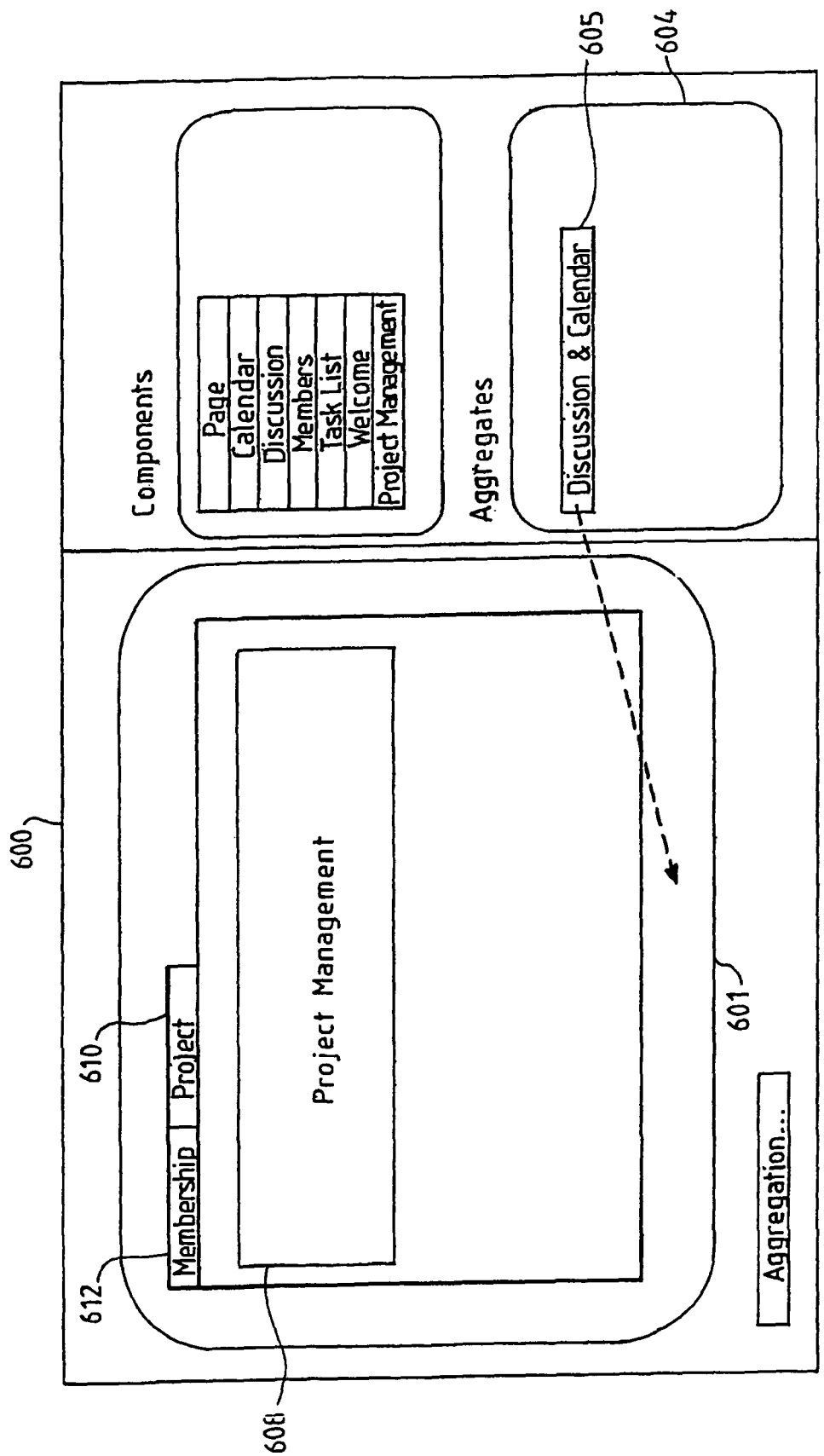
FIGS. 6A and 6B show example screen shots of the user interface of FIG. 3, showing a new aggregate component and its selection by a user.
Figure 6B:
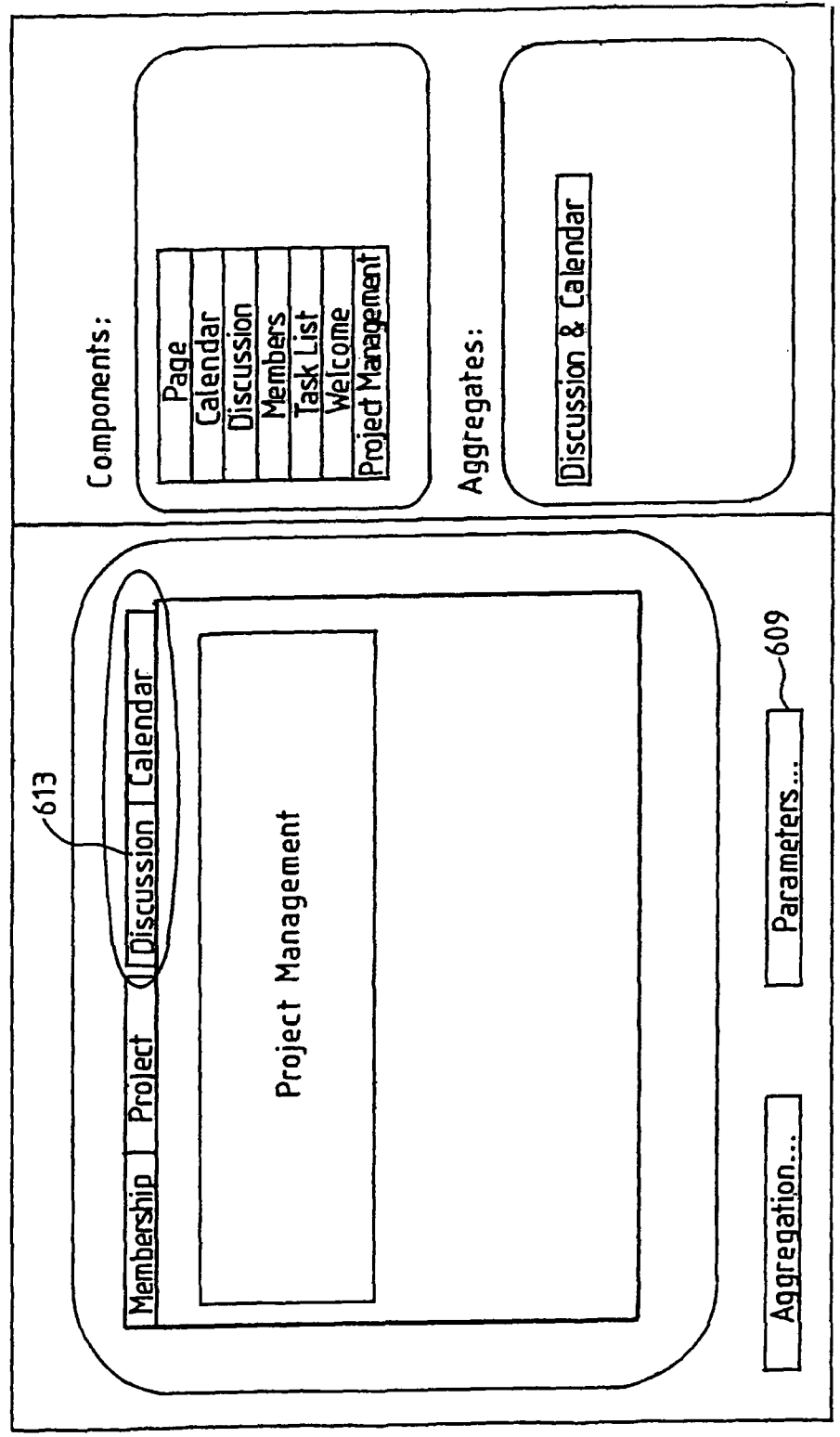

FIGS. 6a and 6b shows the screen available to a user creating a new project, showing this new aggregate component available for addition to the application under creation. The application template under creation comprises a membership page 612 and a project page 610 (currently selected), which includes a project management component 608. By dragging the 'Discussion and Calendar' icon 604 from the list of aggregate components 604 and dropping it onto the application panel 601 (as shown by the broken arrow), a user can add component pages 613 and 614 to the application template.

If the user then selects the parameters button 609, a parameter screen listing the parameters for the new project will be shown, such as that shown in FIG. 7. The properties of the aggregate component 'Discussion & Calendar' are listed, (but not the settings of the individual components within). The parameters marked as editable are the only ones which will be exposed to a user on creation of a new application from the template. The Title parameter of the Discussion and Calendar aggregate component is wired to the Application title, as are the parameters of the membership component. The four other parameters of the Discussion and Calendar component are exposed as editable, with their defaults set. The project template thus has five parameters, the Application Title, and the Category 1, Category 2, Category 3 and View parameters, which a user would be prompted to input when a new instance of this application is being created.

Figure 8:
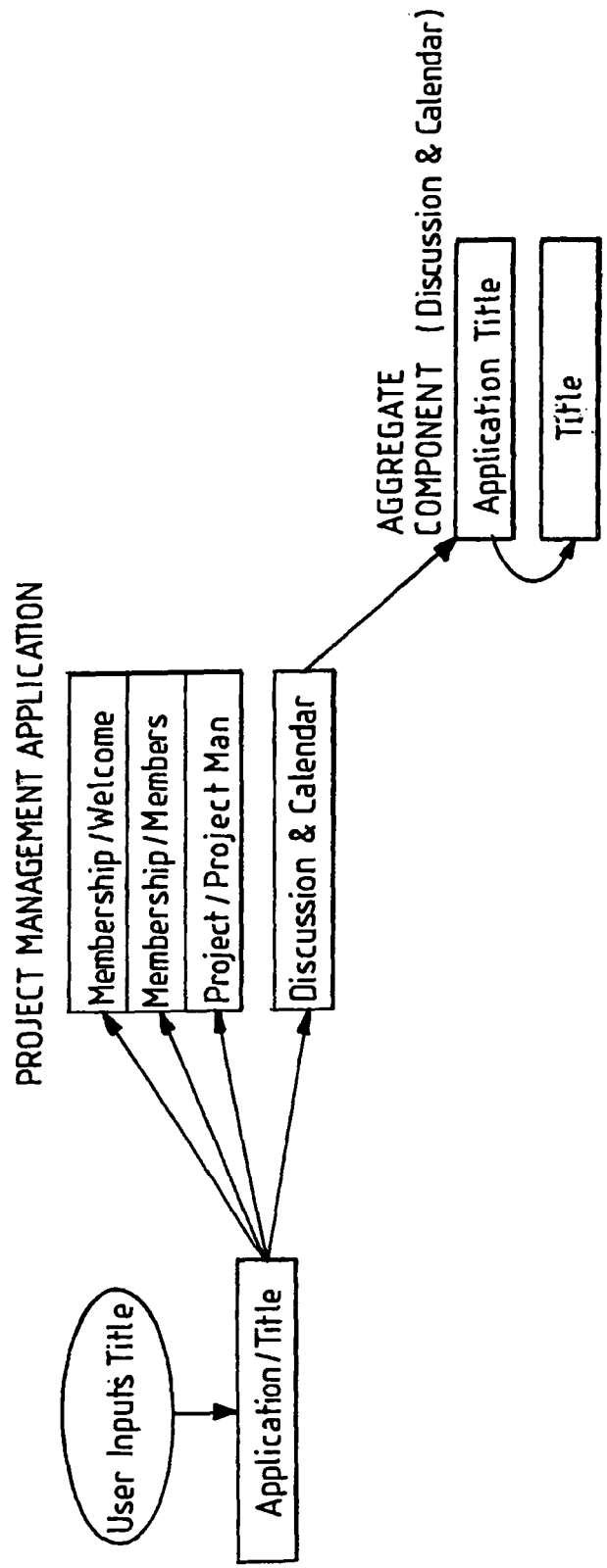
FIG. 8 shows how a parameter is propagated through mappings of configurable elements of components.

FIG. 8 shows how the Title parameter would be propagated when a user were to input a title on creation of an application instance from this template.

Figure 9:
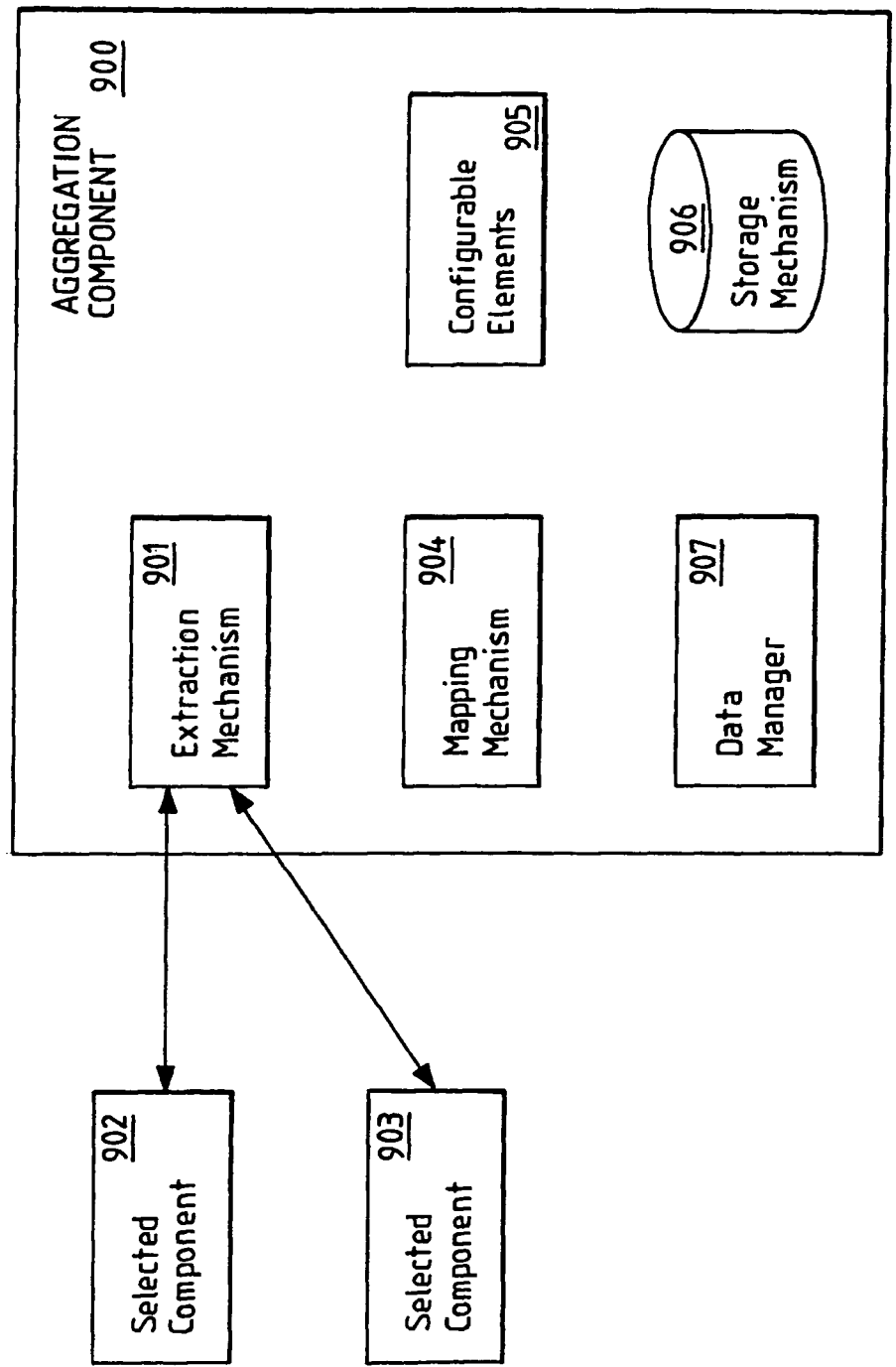
FIG. 9 shows the features of the aggregation component according to a preferred embodiment of the invention.

FIG. 9 illustrates the implementation of an aggregation component 900, which comprises an extraction mechanism 901 for identifying configurable elements of selected components 902 and 903; a mapping mechanism 904 for mapping configurable elements of the selected components 902, 903 to configurable elements 906 of the aggregation component; a storage mechanism 906 for storing data identifying aggregated components and the corresponding mappings of the configurable elements; and a data manager 907 for managing data identifying configuration settings of the selected components 902, 903 in the new instance of the aggregation component.

The data manager 907 carries out lifecycle management, ensuring that when the new application, that is the new instance of the aggregation component, is closed down, the instances of each of the selected components associated with that instance of the aggregation component are also closed down (e.g. using the RemoveInstance method mentioned earlier).

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

We claim:

1. A method of aggregating two or more components as an instance of an aggregation component, each component comprising one or more configurable elements, the method performed by a computer and comprising the steps of:

identifying a selection of components for aggregation;

generating a user interface displaying configurable elements of the selected components and enabling a user to indicate mappings between configurable elements of the selected components;

mapping one or more configurable elements of the selected components to one or more configurable elements of the instance of the aggregation component, according to user indications of mappings received through the user interface, wherein the configurable elements of the selected components include at least one editable parameter, and wherein the mapping specifies that a value of an editable parameter of one of the selected components is to be used as an input to at least one other configurable element of another one of the selected components;
storing instance data for the aggregation component identifying the aggregated components and the mappings of configurable elements; and
storing corresponding instance data for each of the selected components identifying their configuration settings as aggregated.

2. The method according to claim 1, further comprising:
wherein the user interface further enables the user to specify which configurable elements are editable when deploying the instance of the aggregation component.

3. The method according to claim 2, further comprising persisting the instance of the aggregation component and any mappings of configurable elements and user specifications of which configurable elements are editable in a template.

4. The method according to claim 3, further comprising:
processing said template to deploy said instance of the aggregation component;
prompting for values to be assigned to said user-specified editable configurable elements; and
configuring said aggregation component using said mappings of configurable elements.

5. The method according to claim 1, further comprising determining pre-requisite resources required by the aggregation component.

6. The method according to claim 5, further comprising referencing said determined pre-requisite resources in a template of the instance of the aggregation component.

7. The method according to claim 1, further comprising accessing a template interface implemented by a selected component to permit access to content encapsulated in said selected component.

8. The method according to claim 1, comprising accessing, through a proxy, content encapsulated in a selected component which has not implemented a template interface.

9. The method according to claim 1, comprising closing down the instance of the aggregation component, including removing the instance data for that instance of the aggregation component, and removing the corresponding instance data for each of the aggregated components.

10. A system for aggregating two or more components selected for aggregation, each selected component comprising at least one configurable element, the system including a computer readable memory having aggregation component program code stored thereon, the aggregation component program code comprising:
at least one configurable element;
an extraction mechanism operable to identify configurable elements of the selected components;
a user interface mechanism for generating a user interface displaying the configurable elements of the selected components and enabling a user to indicate mappings between the configurable elements of the selected components;
a mapping mechanism for mapping at least one configurable elements of at least one of the selected components to one or more configurable elements of the aggregation component, according to user indications of mappings received through the user interface, wherein the configurable elements of the selected components include at least one editable parameter, and wherein the mapping mechanism specifies that a value of an editable parameter of one of the selected components is to be used as an input to at least one other configurable element of another one of the selected components;
a storage mechanism for storing instance data identifying aggregated components and the mappings of the configurable elements; and
a data manager for managing instance data identifying configuration settings of aggregated selected components.

11. The system according to claim 10, wherein the selected components further comprise at least one of content and prerequisites and the extraction mechanism is operable to extract prerequisites and content of the selected components.

12. The system according to claim 10, wherein the user interface mechanism is further operable to prompt said user to specify default values for the configurable elements.

13. The system according to claim 10, wherein the program code further comprises a templating interface.

14. The system according to claim 13, wherein the program code further comprises a template creator coupled to said template interface, said template creator being operable to create a template identifying the selected components, the mappings between configurable elements of the selected components and configurable elements of the aggregation component and any assigned values of configurable elements of the aggregation component.

15. The system according to claim 14, wherein the template further includes data identifying pre-requisite resources required by the aggregation component instance.

16. The system according to claim 10, wherein the extraction mechanism is further operable to access a template interface implemented by a selected component to permit access to content contained in said selected component.

17. The system according to claim 10, wherein the extraction mechanism is further operable to access content contained in a selected component which has not implemented a template interface through a proxy.

18. The system according to claim 10, wherein the data manager is further operable to remove instance data for an instance of the aggregation component, and the corresponding instance data for each of the aggregated components on closing of the aggregation component instance.

19. A method for producing a template describing an aggregation of two or more selected components using an aggregation component, the method performed by a computer and comprising:
selecting a set of components to be aggregated;
generating a user interface displaying configurable elements of the selected components and enabling a user to indicate mappings between configurable elements of the selected components;
mapping at least one configurable elements of the selected components to at least one configurable element of the aggregation component, according to user indications of mappings received through the user interface, wherein the configurable elements of the selected components include at least one editable parameter, and wherein the mapping specifies that a value of an editable parameter of one of the selected components is to be used as an input to at least one configurable element of another one of the selected components; and
creating a template describing the aggregation component that identifies the selected components and that indicates the mappings of configurable elements.

20. The method according to claim 19 wherein said user interface further enables said user to set default values for one or more configurable elements of the aggregation component.

21. The method according to claim 19, further comprising storing instance data for the instance of the aggregation component and storing corresponding instance data for each of the selected components identifying their configuration settings as aggregated.

22. The method according to claim 19, wherein the template comprises reference to at least one prerequisite resource.

23. The method according to claim 19, further comprising accessing a template interface implemented by said a selected component to permit access to content contained within the component.

24. A computer program product including a computer readable memory, the computer readable memory having template program code stored thereon, the template program code comprising:
 program code for storing a title of an aggregation component;
 program code for storing a listing of pre-requisite resources;
 program code for generating a user interface displaying points of variability in a plurality of aggregated components and enabling a user to indicate mappings between points of variability in the aggregated components;
 program code for storing a listing of points of variability in the aggregation component and mappings of the points of variability in the aggregation component to points of variability in the plurality of aggregated components, wherein the mappings of the points of variability in the aggregation component to points of variability in the plurality of aggregated components are according to user indications of mappings received through the user interface, wherein the points of variability of the aggregated components include at least one editable parameter, wherein the mapping specifies that a value of an editable parameter of one of the selected components is to be used as an input to at least one other configurable element of another one of the selected components; and
 program code for storing a listing of the aggregated components.

25. The computer program product of claim 24, wherein each of said title and listings are formatted within markup language tags which can be processed according to a document type definition expressing meaning for said markup language tags.

26. The computer program product of claim 24, wherein said listing of points of variability further comprises a specification of at least one of a default value and an acceptable value range.

27. A system including a computer readable memory, the computer readable memory having program code stored thereon for aggregating two or more components as an instance of an aggregation component, each component comprising one or more configurable elements, the program code comprising:
 program code for identifying a selection of components for aggregation by the aggregation component;
 program code for generating a user interface displaying configurable elements in the selected components and enabling a user to indicate mappings between configurable elements in the selected components;
 program code for mapping one or more configurable elements of the selected components to one or more configurable elements of the instance of the aggregation component, according to user indications of mappings received through the user interface, wherein at least one of the configurable elements of the selected components is an editable parameter, and wherein the mapping specifies that a value of an editable parameter of one of the selected components is to be used as an input to at least one other configurable element of another one of the selected components;
 program code for storing instance data for the aggregation component identifying the aggregated components and the mappings of configurable elements, and
 program code for storing corresponding instance data for each of the selected components identifying their configuration settings as aggregated.

28. A system including a computer readable memory, the computer readable memory having program code stored thereon for producing a template describing an aggregation of two or more selected components using an aggregation component, the program code comprising:
 program code for selecting a set of components to be aggregated;
 program code for generating a user interface displaying configurable elements of the selected components and enabling a user to indicate mappings between configurable elements of the selected components;
 program code for mapping at least one configurable elements of the selected components to at least one configurable element of the aggregation component, according to user indications of mappings received through the user interface, wherein at least one of the configurable elements of the selected components is an editable parameter, and wherein the mapping specifies a value of an editable parameter of one of the selected components is to be used as an input to at least one other configurable element of another one of the selected components; and
 program code for creating a template describing the aggregated component instance that identifies the selected components and that indicates the mappings of configurable elements.

29. A system including a computer readable memory, the computer readable memory having program code stored thereon, the program code including a user interface, a plurality of templatable components, and an aggregator component operable to aggregate a set of components selected by a user via the user interface, wherein the aggregation component program code comprises:
 an extraction mechanism for identifying configurable elements of the selected components, wherein the configurable elements of the selected components include at least one end user configurable parameters;
 a user interface mechanism for generating a user interface displaying the configurable elements of the selected components and enabling a user to indicate mappings between the configurable elements of the selected components;
 a mechanism for mapping one or more configurable elements of the selected components to configurable elements of the aggregation component, according to user indications of mappings received through the user interface, and wherein the mapping specifies that a value of a configurable element comprising an editable parameter of one of the selected components is to be used as an input to at least one other configurable element of another one of the selected components;
 a mechanism for receiving at least one user-specified default value for at least one configurable element of the aggregation component; and
 a template creator for creating a template of the aggregation component instance, the template identifying the configurable element mappings and default values specified by the user.

* * * * *